United States Patent [19]
Bernier et al.

[11] 4,444,626
[45] Apr. 24, 1984

[54] ELECTROCHROMIC PRINTING

[75] Inventors: William E. Bernier, Endicott; Francis Emmi, Binghamton, both of N.Y.; Edmond O. Fey, Vestal, N.Y.; Paul L. Gendler; Robert J. Twieg, both of San Jose, Calif.

[73] Assignee: International Business Machines Corporation, Armonk, N.Y.

[21] Appl. No.: 459,929

[22] Filed: Jan. 21, 1983

[51] Int. Cl.$^3$ .............................................. G01D 15/06
[52] U.S. Cl. ...................................... 204/2; 346/135.1
[58] Field of Search .................... 204/2, 15; 346/135.1; 427/145

[56] References Cited

U.S. PATENT DOCUMENTS

| | | | |
|---|---|---|---|
| 3,871,972 | 3/1975 | Sekine | 204/2 |
| 3,905,876 | 9/1975 | Yoshino | 204/2 |
| 4,025,399 | 5/1977 | Matsumoto | 204/2 |

*Primary Examiner*—John F. Niebling
*Attorney, Agent, or Firm*—Pollock, Vande Sande & Priddy

[57] ABSTRACT

An electrochromic printable medium which includes a substrate coated with certain organic compounds and with the reduced form of an oxidizing agent; and use thereof for electrochromic printing.

24 Claims, No Drawings

ELECTROCHROMIC PRINTING

DESCRIPTION

1. Technical Field

The present invention is concerned with an improved electrochromic printable medium and to a method for electrolytic printing employing the medium. The method of the present invention includes the use of nonconsumable electrodes. In particular, the present invention is concerned with certain compounds which act as leucodyes in combination with an oxidizing agent to provide printing upon the application of an electrical field.

2. Background Art

In the electrolytic printing art there are at least two general schemes for printing processes. In one such scheme, metallic ions from one of the electrodes are introduced into the printing sheet, and they are either combined with colorless materials already present in the printing sheet in order to form colored complexes or are precipitated as fine metallic particles.

A disadvantage of the above discussed consumable scheme is the fact that the stylus is consumed in the process. This requires complicated printing mechanisms with feeding devices to keep the stylus working.

In another scheme, the electrodes are not consumed, and the writing is accomplished by the electrolytic modification of materials already in the printing sheet. An example of such a procedure is one which employs the reaction of starch and iodine to effect writing. Generally, in this scheme, the electrolysis of potassium iodide or another iodide compound in the paper generates free iodine which reacts with the starch which is also present in the paper, thereby producing a purple starch-iodine complex.

Another example of such a scheme includes dry electrolytic printing in which a very special paper is used consisting of one or two metallized layers. Inherent in this scheme are the disadvantages of requiring expensive paper, requiring special layers of materials, and the requirement of voltages that exceed 100 volts for printing.

The nonconsumable schemes, such as the starch-iodine method, suffer from the lack of permanency of the printing due to fading of the printed marks and also the discoloration of the paper upon storage.

Another type of electrochromic printing system is disclosed in U.S. Pat. No. 4,211,616 to Sambucetti.

U.S. Pat. No. 4,211,616 is concerned with an electrochromic printing composition which contains an iodide compound as a color former, a bromide, and an auxiliary dye to enhance the color of the printed indicia. As discussed on column 3 thereof, the additional dye is one which would tend to form addition compounds with the iodine and thereby stabilize the printed indicia.

Examples of such auxiliary dyes include leuco methylene blue and derivatives, leuco crystal violet, and 4,4'-methylenebis-N,N dimethyl aniline. Suggested leuco methylene blue derivatives include p-sulfonic-benzoyl leuco methylene blue, p-carboxy-benzoyl leuco methylene blue, benzoyl leuco-N,N'p-benzene sulfonic (symmetrical) methylene blue and benzoyl leuco N,N'p-naptholsulfonic (symmetrical) methylene blue.

Another electrochromic recording substrate is reported in U.S. Pat. No. 4,309,255 to Gendler, et al. which includes a water soluble salt of 3,7-bis(dimethylamino)-10-(2-sulfobenzoyl)-phenothiazine.

U.S. patent application Ser. No. 231,832, now U.S. Pat. No. 4,374,001, to Bernier discloses an electrochromic printing media which comprises a substrate coated with a leuco dye having the following formula:

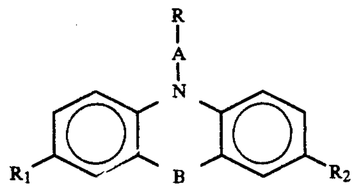

wherein A is C═O or $SO_2$; B is S or O; each $R_1$ and $R_2$ individually is a group capable of donating an electron; and R is an organic radical such that in the presence of bromine and upon being subjected to a voltage, the leucodye converts to a colored dye upon splitting off of the A-R group; and coated with a bromide compound to catalyze an electro-oxidation of the leucodye.

Kitakohji, et al. "Dichromic Electrolytic Recording Paper", Fujitsu Scientific & Technical Journal, September 1976, pp. 131-145, suggest an electrolytic printing by the direct electroreaction of benzoyl-leuco methylene blue employing voltages of about 170 or about 230 volts.

U.S. Pat. Nos. 3,772,159; 3,816,838; 3,864,684; 3,871,972; 3,951,757; 3,974,041; 4,012,292; 4,133,933; and Re. 29,427 are of interest concerning electrorecording members containing various leuco dyes in addition to other required components and the use of very high voltages.

U.S. Pat. Nos. 3,713,996 and 3,726,769 are of interest concerning electrolytic electrosensitive printing.

SUMMARY OF INVENTION

The present invention provides an electrochromic printable medium which makes it possible to preselect from a number of colors, the desired generated color. For instance, various of the leucodyes employed in accordance with the present invention produce a yellow color and upon admixture with an appropriate amount of blue and/or red, produce green or near black.

The present invention also makes it possible to provide an electrochromic printable medium which upon printing exhibits resistance to fading of the printed indicia. Although some discoloration of the background, such as the paper itself, occurs upon storage due to subsequent development of the material on the substrate not subjected to the voltage pattern, the desired colored indicia is still discernable in view of its resistance to fading.

An object of the present invention is to provide an electrochromic printable medium which is suitable in a printing process whereby the power requirements for the printing are such that the desired printing can be operated by use of integrated circuits. In other words, the voltages, currents, and times required for printing are such that they are compatible with those values deliverable by integrated circuits.

Another object of the present invention is to provide an improved electrochromic printing medium for use in a nonconsumable stylus electrolytic printing process. In addition, an object of the present invention is to provide an electrochromic printing medium in which plain paper can be employed.

The electrochromic printing medium of the present invention comprises a substrate coated on at least one surface thereof with certain compounds which function as leucodyes.

The compounds employed are represented by the following formulae:

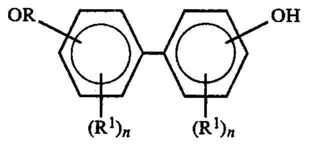
1

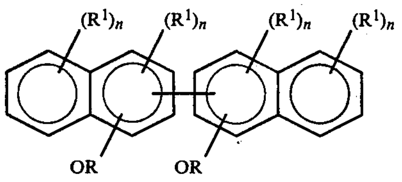
2

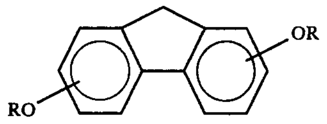
3

In the above formulae each R individually is H or alkyl, or acyl; each $R^1$ individually is alkanoyl or alkyl being 1 to 4 carbon atoms. n is a whole number integer from 0 to 5.

In addition, sulfate esters of any of the above compounds can be employed.

Moreover, mixtures of the above compounds can be employed, if desired.

Also, the substrate is coated with the reduced form of an oxidizing agent in an amount sufficient to catalyze an electrooxidation of the above compounds to produce a colored image.

The present invention is also concerned with the method of electrochromic printing which comprises applying an electric field in a predetermined pattern across the electrochromic printable medium described hereinabove.

BEST AND VARIOUS MODES FOR CARRYING OUT INVENTION

The present invention requires coating at least one surface with at least one compound represented by the following formulae:

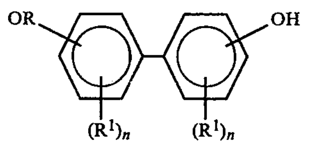
1

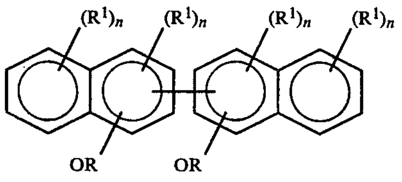
2

-continued

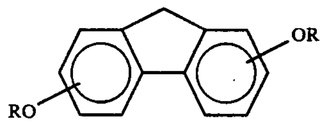
3

Each R individually is H, or alkyl, or acyl. The alkyl group and acyl group can contain 1–22 carbon atoms, and preferably 1–4 carbon atoms. Examples of some alkyl groups are methyl, ethyl, butyl, amyl, hexyl, 2-hexyl, 2-ethylhexyl, nonyl, and octadecyl. Examples of acyl groups include alkanoyl groups obtained from formic acid, acetic acid, propionic acid, and butyric acid.

Each $R^1$ individually is an alkanoyl or alkyl group preferably containing 1 to 4 carbon atoms. Examples of alkanoyl groups are formyl, acetyl, propionyl, and butyryl.

Examples of some alkyl groups for $R^1$ are methyl, ethyl, butyl, and propyl.

In the above formulae, n is a whole number integer from 0 to 5 and preferably 0 to 2 and most preferably 0 or 1. When n is 1 or 2, it is preferred that the substitution be in the ortho position relative to the OR group.

In addition, inorganic esters of the above compounds are contemplated such as sulfuric acid esters.

Examples of some specific compounds employed according to the present invention include

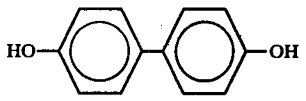
4

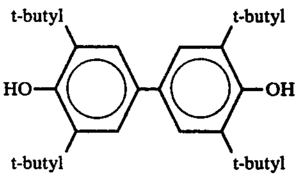
5

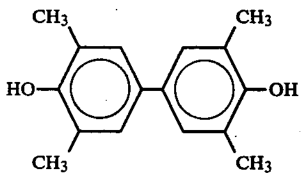
6

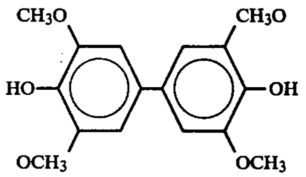
7

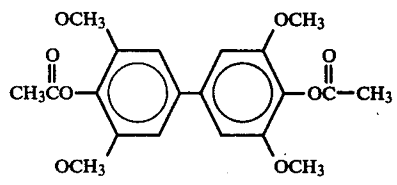
8

-continued

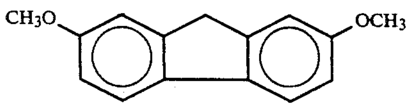

9

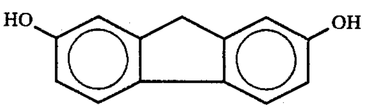

10

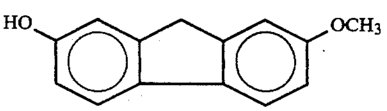

11

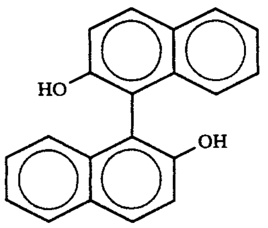

12

Mixtures of the above compounds can be employed if desired. Also, mixtures of one or more of the above compounds with other types of compounds capable of acting as leucodyes can be used when desired.

The compound can be applied to the substrate in the form of a solution of dispersion in water or an organic solvent depending upon the solubility characteristics of the particular compound employed. Typical examples of suitable solvents for the above compounds of formulae 4–12 are alcohols such as ethyl alcohol and ketones such as acetone. Many of the above compounds are soluble or readily dispersible in water and/or aqueous alkaline solutions.

The compound is generally employed in amounts of about 2 to about 100 milligrams per standard page (e.g., $8\frac{1}{2}$" and 11" substrate area). Of course, the relative amount of compound will be adjusted upwardly or downwardly depending upon the size of substrate specifically employed. Amounts greater than about 10 milligrams for the above size substrate are generally not necessary, since about 10 milligrams are sufficient to saturate the substrate surface.

In addition, the substrate surface is coated with the reduced form of an oxidizing agent such as a bromide compound. Examples of suitable bromides include ammonium bromide, potassium bromide, and sodium bromide. Mixtures can be employed, if desired. The reduced form of the oxidizing agent, such as the bromide compound, is present in amounts from about 10 milligrams to about $\frac{1}{4}$ gram per standard page (e.g., $8\frac{1}{2}$" by 11" size substrate). Generally, the reduced form of the oxidizing agent, such as the bromide compound, is present in an amount so as to provide an oxidizing agent, in reduced form, to dye weight ratio of about 1 to about 1 to about 30 to about 1. The preferred weight ratio is about 5:1 to about 10:1. With a bromide as the reduced form of the oxidizing agent, it is believed that the following reaction is accomplished when a current pulse is passed to a substrate having the printing composition thereon:

$2\,Br^- \text{ - - - } Br_2 + 2e^-$(at anode) $Br_2 + \text{Leucodye} \text{ - - - } 2\,Br^- + \text{Colored Dye}$.

The reduced form of the oxidizing agent is present so as to provide an electrooxidation of the colorless compound (e.g., leucodye) into a colored dye. The bromine is generated at the anode.

A preferred bromide composition contains about 9% by weight of ammonium bromide and most preferably potassium bromide and a buffer such as about 1.4% by weight of $KH_2PO_4$.

The substrate employed can be ordinary paper. It is preferred that the medium is at least substantially free from color-forming agents which might tend to react chemically with the dyes.

At least one surface of the substrate is generally coated by applying the reduced form of an oxidizing agent such as the bromide compound in the form of an aqueous solution and at least one of the above disclosed compounds. If desired, the compound can be applied and then the bromide compound or both can be applied in the same diluent depending upon solubility of dispersability. Also, if desired, the substrate can be coated on both surfaces or even totally impregnated with the compositions.

The prepared printing composition can be applied to the substrate, such as ordinary paper, by spraying or other coating techniques. It can be applied just prior to printing or can be applied to the substrate to be used at some future time.

Printing can be provided by conventional electrolytic printers. Particularly, nonconsumable electrodes can be used. A voltage of about 1.5 to about 15 volts is all that is required when employing the printing medium of the present invention to effect the color change. Generally, about 5 volts or more are employed to operate the electronics of the circuitry used. In addition, the voltage, current, and time required are all compatible with those parameters achieved by modern day integrated circuits. The time employed is generally from about 100 to about 1000 microseconds. In addition, for a 10 mil electrode up to only about 4 milliamps of current is needed. The amount of current will change depending upon the size of the electrode.

If the reduced form of the oxidizing agent such as the bromide compound is not present, the printing achieved by the present invention would not be obtainable. For instance, only very little printing can be achieved even employing very long pulses of about 10 to about 20 milliseconds at voltages of up to 30 volts when the reduced form of an oxidizing agent is not employed on the substrate using the compounds of the present invention.

It is noted that the conditions employed for printing according to the present invention are quite different than those required from, for instance, dry electrolytic printing. The large voltages required for such electrolytic printing do not render such medium suitable for use with integrated circuits. The power requirements are not compatible with those generated by integrated circuits.

The substrate or paper is generally wetted by water immediately prior to printing. The pH of the water being about 7 in most instances.

The following nonlimiting examples are presented to further illustrate the present invention.

EXAMPLE 1

Ordinary paper (about $8\frac{1}{2}$" by 11") is coated with a composition containing an aqueous composition of about 9% by weight of potassium bromide and about 1.4% by weight of potassium dihydrogen phosphate. The composition is filtered and sprayed onto ordinary paper. After drying, the paper is then coated with a solution of about 1% by weight of 4,4'-biphenol in acetone to provide about 10 milligrams of the leucodye per page. The paper is then subjected to electrolytic printing apparatus. Indicia are then electrolytically printed on the paper by applying in a predetermined voltage pattern of about 15 volts thereacross. The pulse time is about 700 microseconds. The electrode employed is about 10 mils wide and about 4 milliamps of current are employed. The color of the printed indicia is yellow.

The present invention can employ very high speeds of printing such as about 350 microseconds per dot. The indicia printed under normal conditions of storage are substantially permanent and do not fade. Even with some formation of background due to subsequent development of the undeveloped portions, the printing indicia are still quite discernable.

EXAMPLE 2

The procedure of Example 1 is repeated, except that the dye employed is represented by formula 5. The results obtained are similar to those of Example 1.

EXAMPLE 3

The procedure of Example 1 is repeated, except that the dye employed is represented by formula 6. The results obtained are similar to those of Example 1, except that the color is greenish yellow.

EXAMPLE 4

The procedure of Example 1 is repeated, except that the dye employed is represented by formula 7. The results obtained are similar to those of Example 1, except that the color is red.

EXAMPLE 5

The procedure of Example 1 is repeated except that the dye employed is represented by formula 8. The results obtained are similar to those of Example 1, except that the color is red.

EXAMPLE 6

The procedure of Example 1 is repeated, except that the dye employed is represented by formula 10. The results obtained are similar to those of Example 1.

EXAMPLE 7

The procedure of Example 1 is repeated, except that the dye employed is represented by formula 12. The results obtained are similar to those of Example 1, except that the color is reddish brown.

What is claimed is:

1. An electrochromic printing medium which comprises a substrate coated on at least one surface thereof with at least one compound selected from the group of:

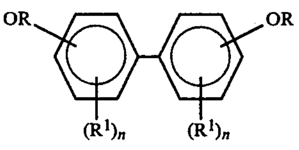

-continued

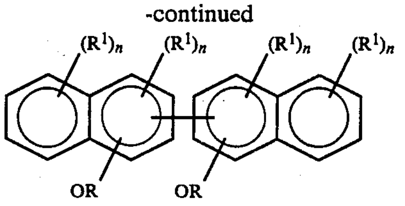

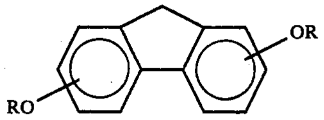

mixtures thereof, or inorganic acid salts thereof; wherein each R individually is selected from the group of H, alkyl, or acyl; each $R^1$ individually is selected from the group of alkanoyl or alkyl being 1 to 4 atoms; and n is a whole number integer from 0 to 5; and coated with a bromide in an amount sufficient to catalyze an electrooxidation of said compound.

2. The medium of claim 1 wherein the alkyl and acyl groups of R contain 1–22 carbon atoms.

3. The medium of claim 1 wherein the alkyl and acyl groups of R contains 1–4 carbon atoms.

4. The medium of claim 1 wherein n is 0 to 2.

5. The medium of claim 1 wherein n is 0 or 1.

6. The medium of claim 1 wherein said compound is 4,4'-biphenol.

7. The medium of claim 1 wherein said compound is a derivative of 4,4'-biphenol.

8. The medium of claim 1 wherein said compound is a dihydroxy fluorene.

9. The medium of claim 1 wherein said compound is 1,1'-bi-2-napthol.

10. The electrochromic printing medium of claim 1 wherein the bromide is selected from the group of ammonium bromide, potassium bromide, sodium bromide, and mixtures thereof.

11. The electrochromic printing medium of claim 1 wherein the weight ratio of the reduced form of an oxidizing agent to said compound is about 1 to 1 to about 30 to 1.

12. The electrochromic printing medium of claim 1 wherein the weight ratio of said reduced form of an oxidizing agent to said compound is about 5:1 to about 10:1.

13. The electrochromic printing medium of claim 1 wherein said compound is employed in amounts of about 2 to about 100 milligrams for each 8½" by 11" area of substrate.

14. The electrochromic printing medium of claim 13 wherein the maximum amount of said compound is about 10 milligrams.

15. The electrochromic printing medium of claim 1 wherein said oxidizing agent is employed in an amount of about 10 milligrams to about ¼ gram for each 8½" by 11" area of substrate.

16. The electrochromic printing medium of claim 1 wherein said substrate is ordinary paper.

17. A method of electrochromic printing which comprises applying an electrical field in a predetermined pattern wherein the voltage applied is about 1.5 to about 15 volts across an electrochromic printable medium which comprises:

a substrate coated on at least one surface thereof with at least one compound selected from the group of:

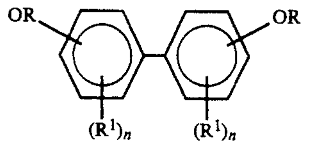

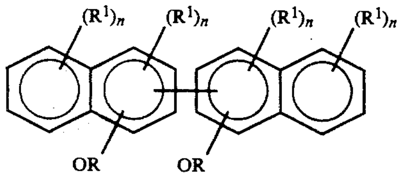

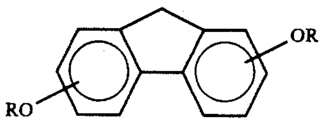

mixtures thereof, or inorganic acid salts thereof; wherein each R individually is selected from the group of H, alkyl, or acyl; each $R^1$ individually is selected from the group of alkanoyl or alkyl being 1 to 4 atoms; and n is a whole number integer from 0 to 5; and coated with an oxidizing agent in an amount sufficient to catalyze an electrooxidation of said compound.

18. The medium of claim 1 which is substantially free from color-forming agents which tend to react chemically with said compound.

19. A method of electrochromic printing which comprises applying an electrical field in a predetermined pattern, wherein the voltage applied is at least about 5 volts across an electrochromic printable medium which comprises:

a substrate coated on at least one surface thereof with at least one compound selected from the group of:

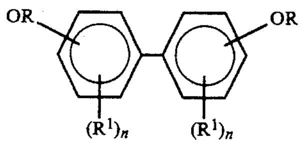

-continued

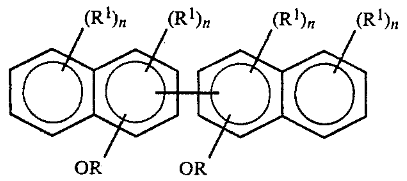

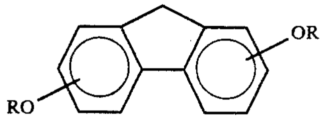

mixtures thereof, or inorganic acid salts thereof; wherein each R, individually, is selected from the group of H, alkyl, or acyl; each $R^1$, individually, is selected from the group of alkanoyl or alkyl being 1 to 4 atoms; and n is a whole number integer from 0 to 5; and coated with an oxidizing agent in an amount sufficient to catalyze an electrooxidation of said compound.

20. An electrochromic printing medium which comprises a substrate coated on at least one surface thereof with at least one compound selected from the group of: 4,4'-biphenol; derivative of 4,4'-biphenol of the formula:

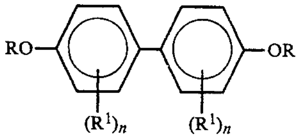

or inorganic acid salts thereof; wherein each R, individually, is selected from the groups of H, alkyl, or acyl; each $R^1$, individually, is selected from the group of alkanoyl or alkyl being 1 to 4 atoms; a dihydroxy fluorene; and 1,1'-bi-2-napthol; and coated with the reduced form of an oxidizing agent in an amount sufficient to catalyze an electrooxidation of said compound.

21. The medium of claim 20 wherein said compound is 4,4'-biphenol.

22. The medium of claim 20 wherein said compound is a derivative of 4,4'-biphenol.

23. The medium of claim 20 wherein said compound is a dihydroxy fluorene.

24. The medium of claim 20 wherein said compound is 1,1'-bi-2-napthol.

* * * * *

UNITED STATES PATENT AND TRADEMARK OFFICE

CERTIFICATE OF CORRECTION

PATENT NO. : 4,444,626

DATED : Bernier, et al.

INVENTOR(S) : April 24, 1984

It is certified that error appears in the above-identified patent and that said Letters Patent is hereby corrected as shown below:

Column 3, Formula 1, please change "OH" to --- OR ---.

Column 3, under the heading "Best and Various Modes for Carrying out Invention", Formula 1, please change "OH" to --- OR ---.

Signed and Sealed this

*Second* Day of *October 1984*

[SEAL]

*Attest:*

GERALD J. MOSSINGHOFF

*Attesting Officer* *Commissioner of Patents and Trademarks*